United States Patent

Holling et al.

[11] Patent Number: 5,821,713
[45] Date of Patent: Oct. 13, 1998

[54] COMMUTATION POSITION DETECTION SYSTEM AND METHOD

[75] Inventors: George Holling, Princeton; Mark Yeck; Michael Schmitt, both of Ripon, all of Wis.

[73] Assignee: Advanced Motion Controls, Inc., Princeton, Wis.

[21] Appl. No.: 794,608

[22] Filed: Feb. 3, 1997

Related U.S. Application Data

[63] Continuation-in-part of Ser. No. 526,525, Sep. 11, 1995, Pat. No. 5,600,218.

[51] Int. Cl.$^6$ .................................................. H02P 6/02
[52] U.S. Cl. ........................... 318/439; 318/254; 318/138
[58] Field of Search ..................... 318/138, 139, 318/245, 254, 439, 260–296, 560–696, 699–832; 388/800–824; 360/70–88

[56] References Cited

U.S. PATENT DOCUMENTS

| | | | |
|---|---|---|---|
| 3,775,648 | 11/1973 | Brown et al. ............................ | 318/138 |
| 4,395,671 | 7/1983 | Sandler et al. .......................... | 318/786 |
| 4,780,651 | 10/1988 | Nakano et al. .......................... | 318/254 |
| 4,876,491 | 10/1989 | Squires et al. . | |
| 4,992,710 | 2/1991 | Cassat . | |
| 5,028,852 | 7/1991 | Dunfield . | |
| 5,041,774 | 8/1991 | Komatsu ................................ | 318/727 |
| 5,097,190 | 3/1992 | Lyons et al. . | |
| 5,115,174 | 5/1992 | Masuda et al. . | |
| 5,122,715 | 6/1992 | Kimura et al. .......................... | 318/138 |
| 5,130,620 | 7/1992 | Inaji et al. . | |
| 5,142,208 | 8/1992 | Curran et al. . | |
| 5,144,209 | 9/1992 | Ingji et al. ............................... | 318/254 |
| 5,159,246 | 10/1992 | Ueki . | |
| 5,177,416 | 1/1993 | Injai et al. ............................... | 318/254 |
| 5,182,499 | 1/1993 | Inaji et al. ............................... | 318/254 |
| 5,191,270 | 3/1993 | McCormack . | |
| 5,204,594 | 4/1993 | Carobolante . | |
| 5,254,914 | 10/1993 | Dunfield et al. ........................ | 318/254 |
| 5,254,918 | 10/1993 | Ueki ........................................ | 318/254 |
| 5,287,044 | 2/1994 | Izawa et al. ............................. | 318/254 |
| 5,304,903 | 4/1994 | Nakai et al. ............................ | 318/254 |
| 5,311,105 | 5/1994 | Nakai et al. ............................ | 318/254 |
| 5,319,291 | 6/1994 | Ramirez ................................. | 318/254 |
| 5,327,053 | 7/1994 | Mann et al. . | |
| 5,469,033 | 11/1995 | Huang ..................................... | 318/439 |
| 5,491,391 | 2/1996 | Bahr et al. .............................. | 318/39 |
| 5,502,361 | 3/1996 | Moh et al. .............................. | 318/254 |
| 5,532,561 | 7/1996 | Huang ..................................... | 318/439 |

*Primary Examiner*—Paul Ip
*Attorney, Agent, or Firm*—Haugen and Nikolai, P.A.

[57] ABSTRACT

An improved commutation position detection system for accurately determining commutation position within polyphase brushless motors without employing proximity sensors or transducers. The present invention determines commutation position. by differentiating the current flowing within the stator coils and comparing the differentiated current waveforms to one another (absolute commutation position detection) or a predetermined threshold (incremental commutation position detection) to obtain a real-time assessment of commutation position.

30 Claims, 10 Drawing Sheets

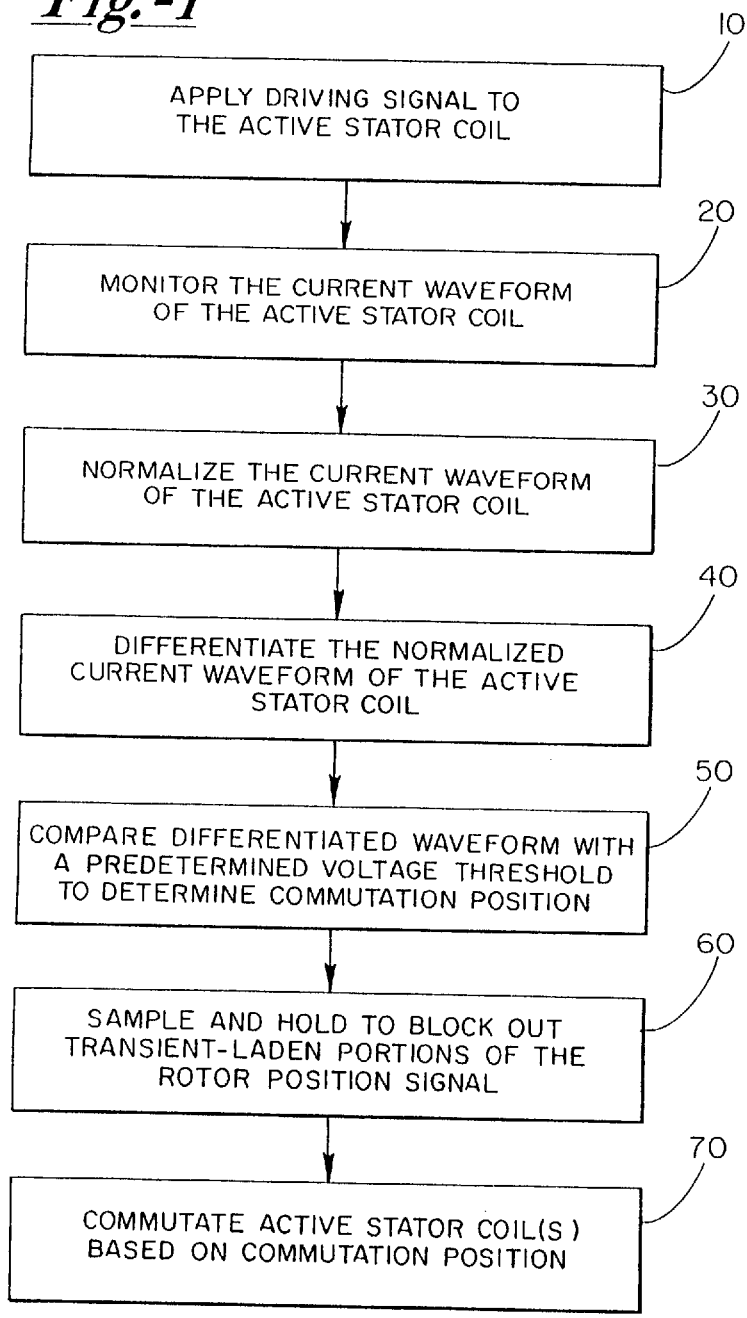

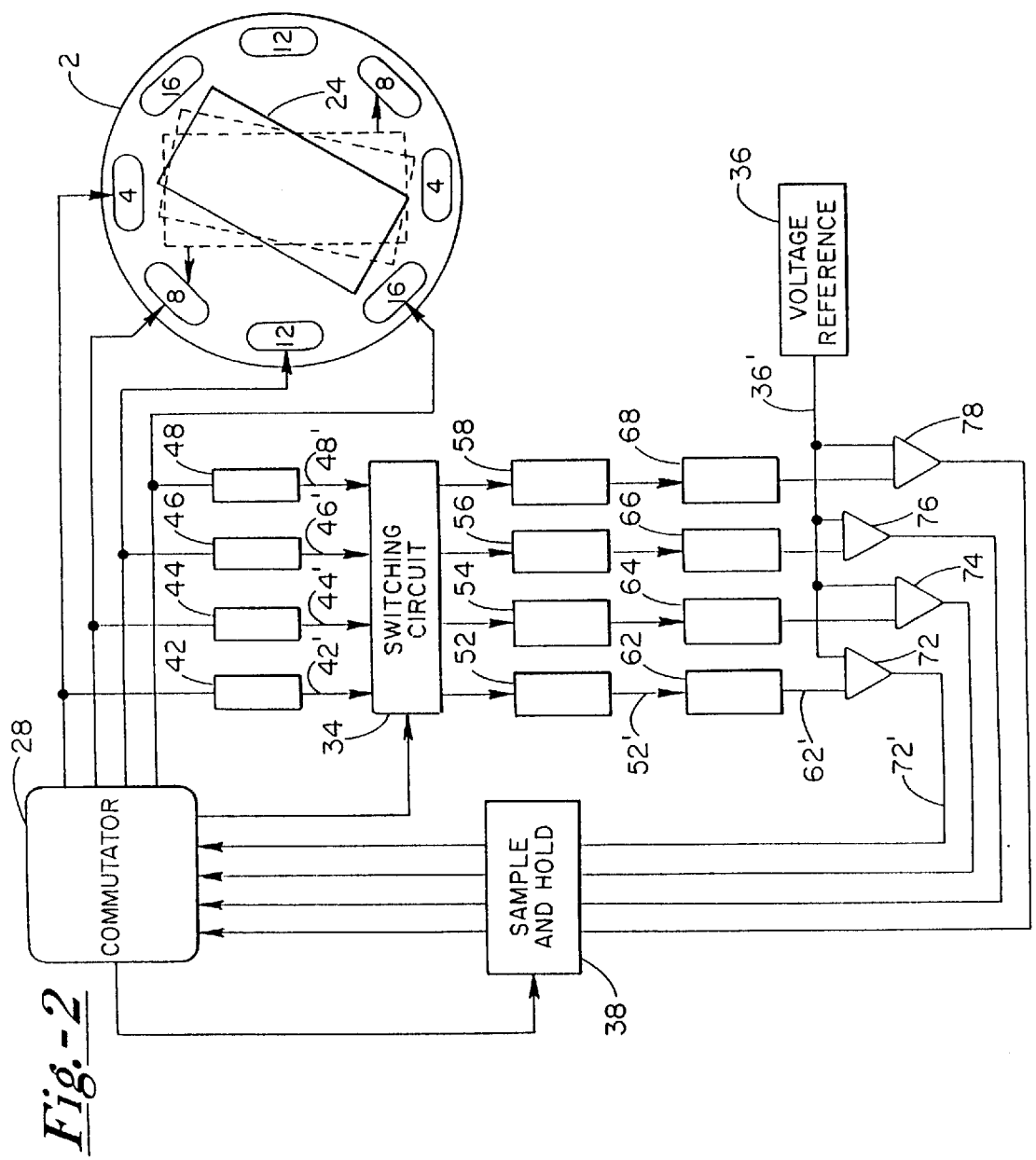

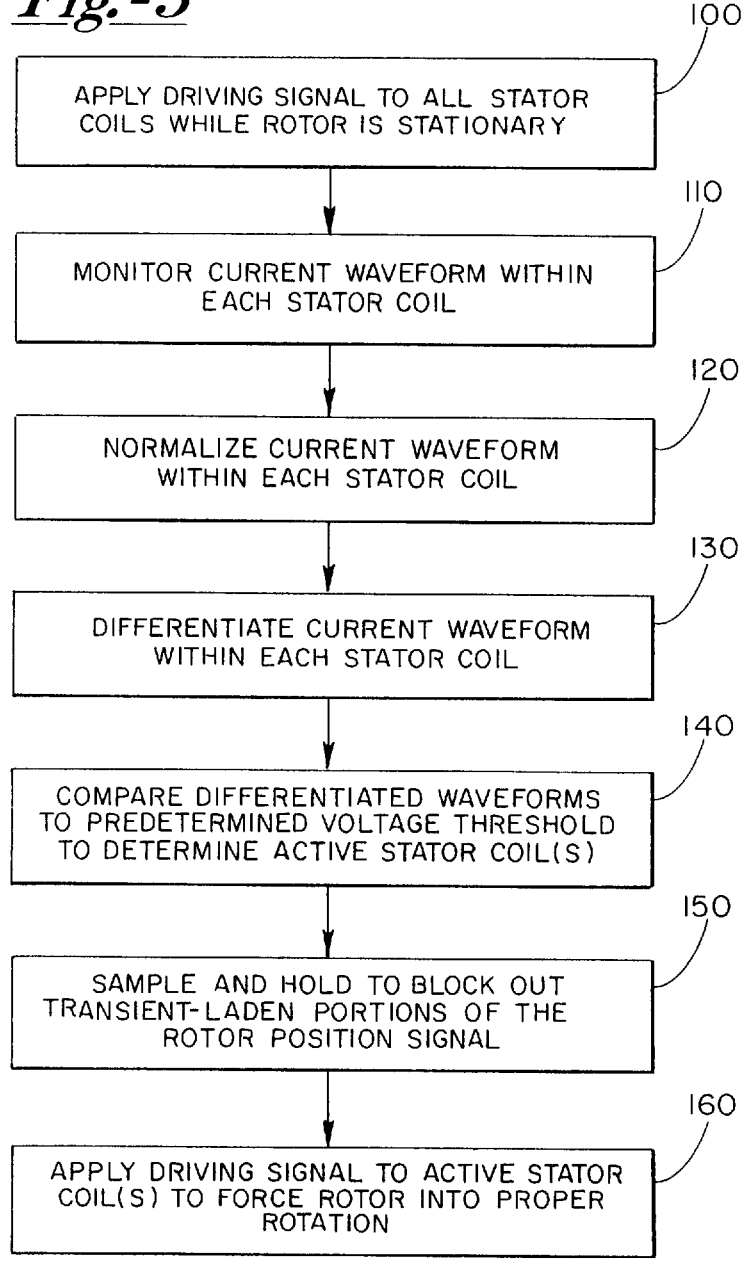

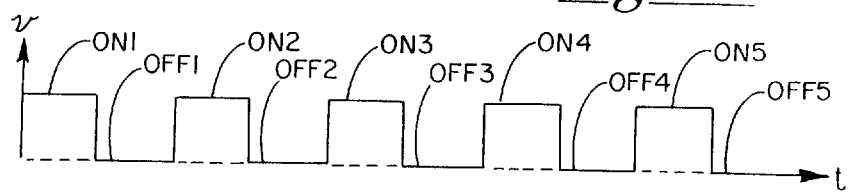
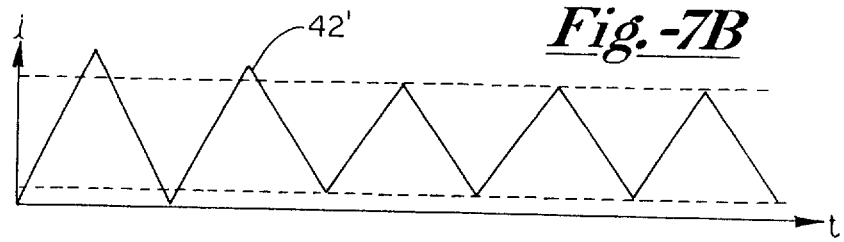
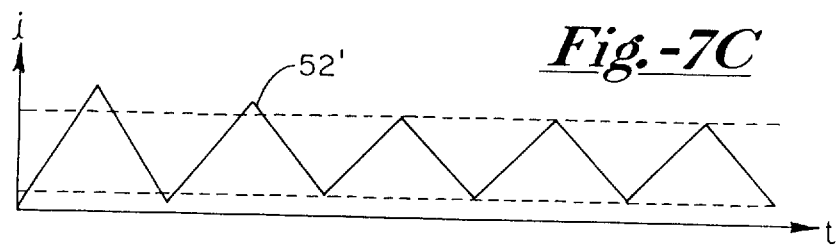
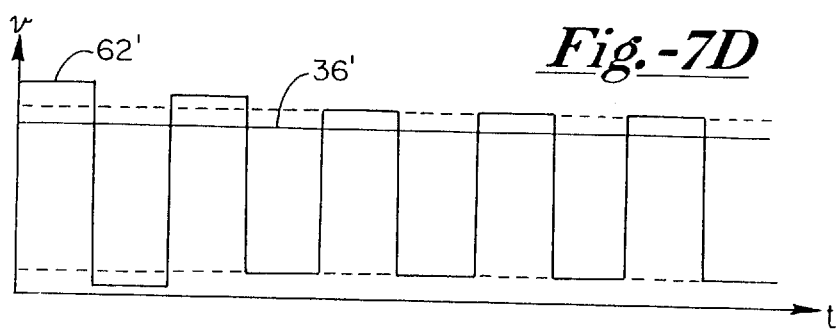
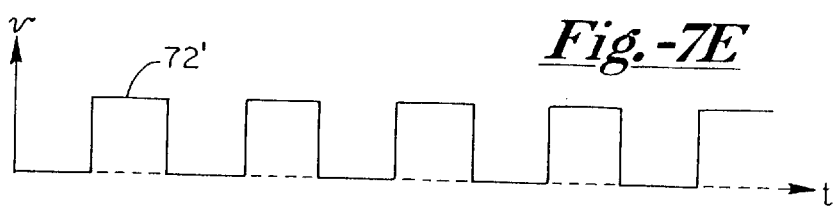

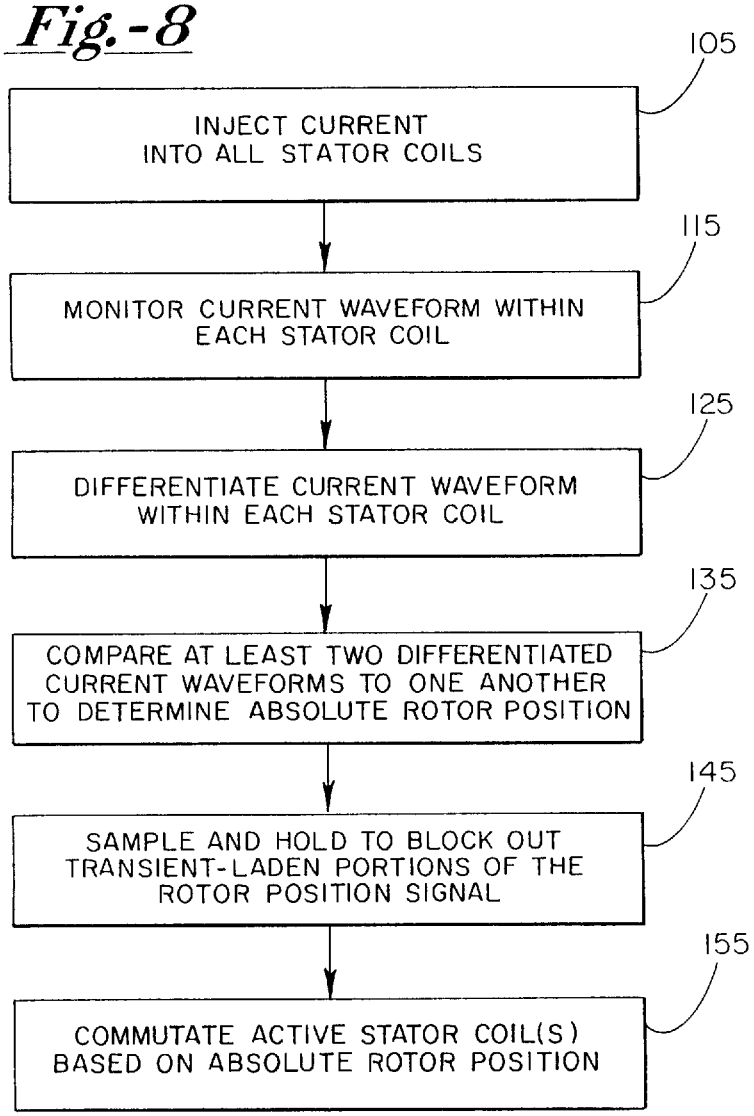

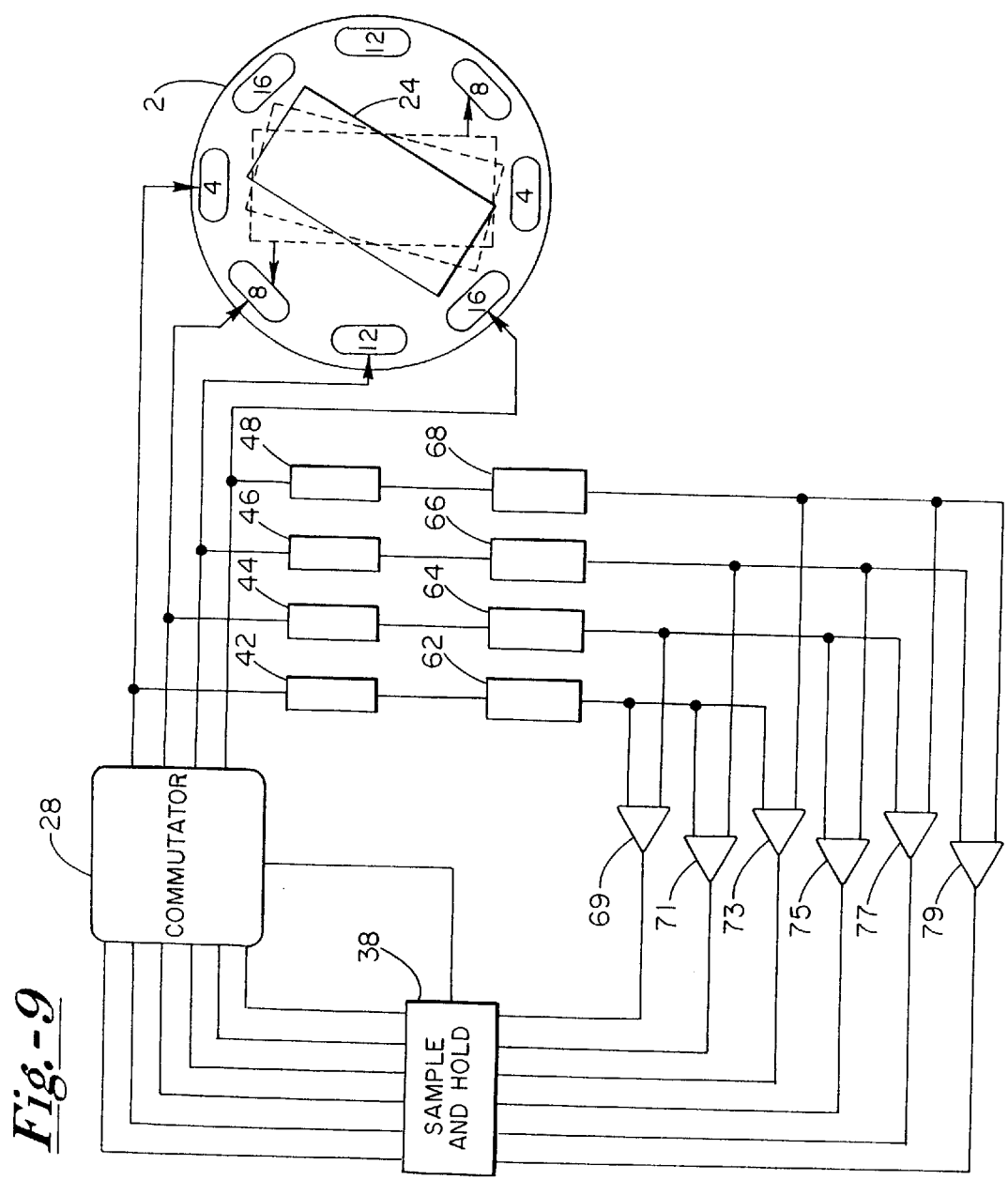

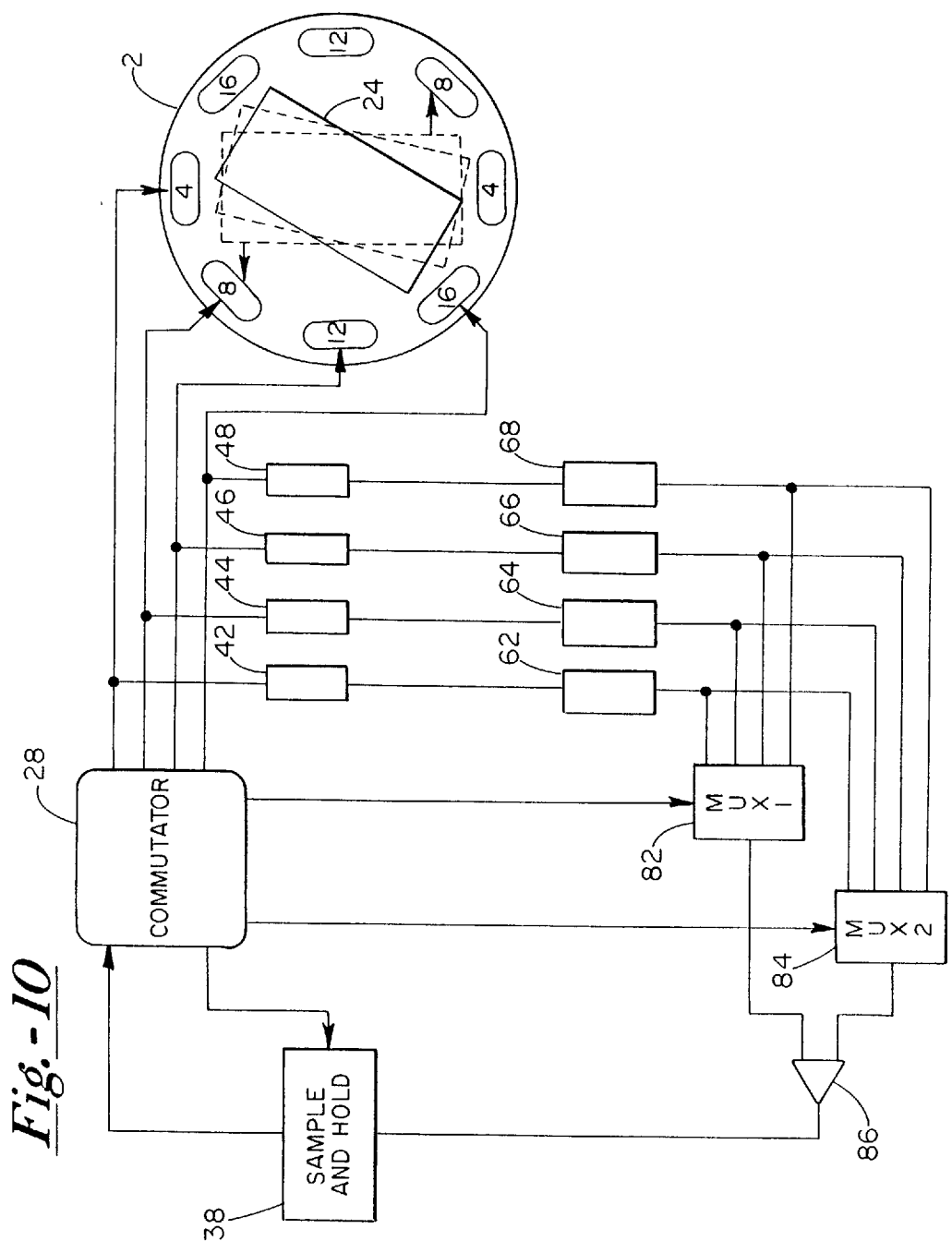

COMMUTATION POSITION DETECTION SYSTEM AND METHOD

BACKGROUND OF THE INVENTION

This is a continuation-in-part of application Ser. No. 08/526,525, filed Sep. 11, 1995, now Pat. No. 5,600,218 entitled "SENSORLESS COMMUTATION POSITION DETECTION FOR BRUSHLESS MOTORS," the teachings of which are hereby expressly incorporated by reference.

I. Field of the Invention

The present invention relates generally to the field of detecting the position of a rotor within a polyphase brushless motor. More particularly, the present invention is directed to an apparatus and method for detecting the position of a rotor within a polyphase brushless motor based on the rate of change (dI/dT) of the current flowing within the active and/or non-active stator coils.

II. Discussion of the Related Art

Generally speaking, brushless motors include a rotor and a stator having a plurality of wound field coils. Brushless motors have gained increasing popularity and enjoy a wide array of industrial applications due, in large part, to the fact that brushless motors are electronically commutated, wherein solid-state switching replaces the brushes and segmented commutators of traditional permanent magnet DC motors. The elimination of brushes simplifies motor maintenance as there are no brushes to be serviced or replaced. Furthermore, noise reduction is effectuated because, without brushes, there is no arcing to create electromagnetic interference. The elimination of arcing also minimizes any explosion hazard in the presence of flammable or explosive mixtures. Thus, brushless motors are ideal for use in any setting where sensitive circuitry or hazardous conditions exist or are present.

Brushless motors may be of the variable reluctance, permanent magnet, or hybrid type. Variable reluctance brushless motors are characterized by having an iron core rotor chase sequentially shifting magnetic fields of the stator coils to attract the rotor into rotational motion. Permanent magnet brushless motors are characterized by having the sequentially energized field coils attract or repel a permanent magnet rotor into rotational motion. Hybrid brushless motors, such as stepper motors, are operated by a train of pulses so that their rotors move or are indexed over a carefully controlled fraction of a revolution each time they receive an input step pulse. This permits rotor movement to be controlled with high precision which can be translated into precise rotational or linear movement.

To ensure proper rotational and linear movement in variable reluctance and permanent magnet brushless motors, it is essential to determine the position of the rotor with respect to the energized, or active, stator coils. By knowing this position, referred to as commutation position, the stator coils can be energized in the appropriate sequence to create a revolving magnetic field in the motor to exert the desired rotational or linear torque on the rotor. Traditionally, commutation position is detected by employing one or more transducers within the particular brushless motor to sense the position of the rotor relative to the active stator coil or coils.

However, the use of transducers to determine commutation position has several drawbacks. First, these sensors increase production costs due to the need for sophisticated positional adjustment and increased wiring. Moreover, the space required for commutation position sensors is also a significant disadvantage in that valuable space is consumed within the motor housing. With an ever increasing premium on space and cost efficiency, several attempts have been made to create "sensorless" commutation position feedback systems to replace the need for commutation position sensors within brushless motors.

U.S. Pat. No. 5,327,053 to Mann et al. employs one such "sensorless" technique, wherein the back-EMF voltage in an unenergized stator coil is employed to determine commutation position during motor start-up. This method is based on a proportional relationship, wherein the back-EMF voltage generated in the stator coils during motor operation is a function of motor speed, rotational direction, and commutation position. However, a significant disadvantage exists with this technique in that back-EMF voltage is difficult to reliably measure during the low rotational velocity of the rotor during start up operations. This may prove especially troublesome in applications such as computer disk drive motors, where proper rotational direction at start up is required to avoid damaging disk contents.

U.S. Pat. No. 5,191,270, issued to McCormack represents an attempt to overcome the disadvantages of the back-EMF method. In this technique, "sensorless" commutation detection is performed during the start up phase of operation. An initial measurement is made of the current rise time within each stator coil by applying a known voltage to each stator coil while the rotor is held stationary. A driving current is then supplied to the stator coil which is most nearly aligned with the magnetic field of the rotor so as to move the rotor slightly. A second current rise time measurement is conducted in similar fashion and compared to the initial current rise time measurement. Measurements of initial and second current rise times are analyzed for each stator coil to indicate which stator coil should be energized first to provide proper rotational direction of the rotor at start-up.

A major disadvantage exists, however, in that this method is limited solely to start-up operations. In particular, this method is aimed at determining the rotational direction of a computer disk drive during start-up so as to avoid damaging disk contents from improper rotational direction. To accomplish this, the current rise time within each stator coil is measured at two discrete intervals merely to determine which of the stator field coils should be initially energized to start the rotor in the correct rotational direction. This method, however, does not account for the commutation position of the rotor with respect to the stator field coils continuously throughout the normal, full speed operation of the motor.

Furthermore, this method does not provide an accurate assessment of commutation position. As mentioned above, this method merely measures the current rise times in all stator coils at two discrete points in time, compares these values, and initiates rotation accordingly. By basing the commutation position detection on two discrete measurements, this method must assume certain positional characteristics that cannot be assessed during the interim between current rise time measurements. These assumptions cause this method to be accurate only within one commutation, as opposed to the entire operational cycle. This can be a significant hindrance to proper motor operation because the stator coils cannot be continuously driven in an efficient fashion without an accurate and continuous determination of commutation position.

A further disadvantage of this method is that the determination of commutation position is based upon the absolute value of the current flowing within the motor. By measuring the current rise times within each stator coil at fixed time intervals, this method is highly susceptible to variations or fluctuations in motor speed, motor load, PWM frequency, and bus voltage. For example, an increase in the motor load will require the pulse width of the driving signal to be lengthened to increase the energy supplied to the motor to compensate for the increased load. Such variations in pulse width cause the current rise time measurement to vary in amplitude depending on the load experienced, thereby adversely affecting the accuracy and reliability of the commutation position detection.

What is needed therefore, is a commutation position detection system which is capable of accurately and continuously assessing commutation position throughout the entire commutation process, rather than merely at start-up. A need also exists for a commutation position detection system that is not dependent on the absolute value of the current flowing within the motor.

OBJECTS AND SUMMARY OF THE INVENTION

Accordingly, it is a primary object of the invention to provide an improved method and apparatus for "sensorless" commutation position detection which is capable of reliable, accurate, and continuous commutation position detection throughout the entire operation of the motor.

Another object of the invention is to provide an improved method and apparatus for "sensorless" commutation position detection which operates independent of the absolute value of the current flowing within the motor to reliably and accurately determine commutation position regardless of variations in motor speed and load, PWM frequency, and/or bus voltage.

An additional object of the invention is to provide an improved method and apparatus for "sensorless" commutation position detection capable of detecting a stalled condition within the motor.

In accordance with a broad aspect of the present invention, a method is provided for starting a polyphase brushless motor having a plurality of field coils disposed about a rotor, comprising the steps of: (a) simultaneously energizing each of the plurality of field coils with a driving signal while the rotor is maintained in a fixed position within said motor; (b) continuously monitoring the current waveform for each of the plurality of field coils during the step of simultaneously energizing;(c) continuously differentiating the current waveform for each of the plurality of field coils to define a current rate of change waveform for each of the plurality of field coils; (d) comparing the current rate of change waveform for each of the plurality of field coils to a predetermined voltage threshold to determine an active field coil from the plurality of field coils; and (e) applying a driving signal to the active field coil to initiate the rotor into motion within the motor.

According to another broad aspect of the present invention, disclosed is a method for starting a brushless polyphase motor having a rotor and a plurality of field coils, comprising the steps of:(a) applying a driving signal to each of the plurality of field coils while the rotor is stationary; (b) continuously differentiating the current waveform within each of the plurality of field coils during step (a); (c) continuously comparing the differentiated current waveforms from step (b) to a predetermined voltage threshold; and (d) selectively energizing at least one of the plurality of field coils based on the comparisons from step (c) to force the rotor into proper rotational motion.

According to yet another broad aspect of the present invention, disclosed is a method for detecting the position of a rotor with respect to a plurality of field coils in a polyphase brushless motor, comprising the steps of:(a) continuously injecting at least a predetermined nominal exciting current into each of the plurality of field coils;(b) continuously monitoring the current waveform for each of the plurality of field coils during the step of continuously injecting;(c) continuously differentiating the current waveform for each of the plurality of field coils to define a current rate of change waveform for each of the plurality of field coils; and (d) comparing the magnitude of at least two of the current rate of change waveforms to one another to produce an absolute reference indicative of the position of the rotor within the motor.

In still another broad aspect of the present invention, a method is disclosed for determining commutation position within a brushless motor having a plurality of stator coils disposed about a rotor, comprising the steps of:(a) applying at least a predetermined nominal electric current to each of the plurality of stator coils; (b) continuously differentiating the electric current flowing within each of the plurality of stator coils during step (a) to produce a current rate of change waveform for each of the plurality of stator coils; and (c) continuously comparing together at least two of the current rate of change waveforms to determine an absolute reference indicative of the position of the rotor within the motor.

Yet another broad aspect of the present invention boasts an apparatus for controlling the operation of a polyphase brushless motor having rotor and a plurality of stator coils. The apparatus includes commutation position detection means for determining the position of the rotor relative to the plurality of stator coils. The commutation position detection means includes current sensing means for sensing the amount of electric current flowing within each of the plurality of stator coils, differentiation means for differentiating the amount of electric current flowing within each of the plurality of stator coils, and comparator means for comparing together the differentiated electric current of at least two of the plurality of stator coils to determine an absolute reference indicative of a position of the rotor within the motor. The apparatus also includes commutation means for selectively applying at least a predetermined nominal electric current to each of the plurality of stator coils and selectively applying a driving signal to one or more of the plurality of stator coils depending upon the absolute reference.

In still a further broad aspect of the present invention, provided is an apparatus for determining commutation position within a brushless motor having a rotor and plurality of stator coils. The apparatus includes current sensing means for sensing the amount of electric current flowing within each of the plurality of stator coils. The apparatus further includes differentiation means for differentiating the amount of electric current flowing within each of the plurality of stator coils, and comparator means for comparing together the differentiated electric current of at least two of the plurality of stator coils to determine an absolute reference indicative of a position of the rotor within the motor.

Other objects and advantages of the invention will become apparent to those skilled in the art in accordance with the descriptions and Figures of this specification.

BRIEF DESCRIPTION OF THE DRAWINGS

In the drawings, wherein like numerals are utilized to designate like parts throughout the same:

FIG. 1 is a flow chart depicting the fundamental steps in the incremental commutation position detection method of the present invention during normal operation;

FIG. 2 is a block diagram depicting an exemplary application of the incremental commutation position detection method set forth in FIG. 1;

FIG. 5 is a flow chart depicting the algorithm for starting the brushless polyphase motor via the incremental commutation position detection method of the present invention;

FIG. 7 represents the PWM signal supplied to the active stator coil of FIG. 6 during a single commutation cycle;

FIG. 7B is the current waveform within the active stator coil of FIG. 6 during commutation;

FIG. 7C is the normalized current waveform of the active stator coil of FIG. 6 during commutation;

FIG. 7D represents the comparison of the current rate of change waveform of the active stator coil of FIG. 6 with a predetermined voltage threshold;

FIG. 7E is the comparator output signal of the comparison illustrated in FIG. 7D;

FIG. 8 is a flow chart depicting the fundamental steps of the absolute commutation position detection method of the present invention;

FIG. 9 is an exemplary application of the absolute commutation position detection method set forth in FIG. 8 with a parallel encoding arrangement; and FIG. 10 is still another exemplary application of the absolute commutation position detection method set forth in FIG. 8 with a multiplexed encoding arrangement.

DETAILED DESCRIPTION OF THE PREFERRED EMBODIMENT

Figure 3A:
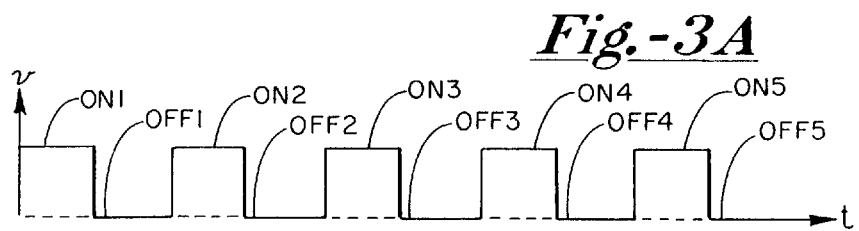
FIG. 3A represents the PWM signal supplied to the active stator coil of FIG. 2 during a single commutation cycle.

The present invention provides an incremental commutation position detection system and an absolute commutation position detection system which are advantageously capable of accurately determining commutation position within polyphase brushless and/or stepper motors without employing proximity sensors or transducers. As used herein, the term "commutation position" refers to the physical position of a rotor relative to the various stator coils within a polyphase brushless motor. By identifying this positional information, the stator coils may be sequentially energized in an optimal fashion to create a rotating magnetic field within the motor which exerts maximal rotational and/or linear torque on the rotor. This positional information may also be employed to detect stalled conditions within polyphase brushless motors.

Broadly speaking, the present invention bases the determination of commutation position on the well known principle that the inductance of each stator coil within a polyphase brushless motor changes in direct relation to its position relative to the rotor. Although stator coil inductance is an excellent indicator of commutation position, it is difficult to accurately assess through direct measurement. The present invention advantageously overcomes this by employing the following formula:

$$dI/dT = \frac{(V - I*R - d\phi/d\alpha)}{L}$$

where: dI/dT=rate of change of the current flowing within each stator coil;
V=voltage applied to each stator coil;
I=current flowing within each stator coil;
R=resistance of each stator coil;
L=inductance of each stator coil; and
dΦ/dα=change in magnetic flux of each stator coil relative to change in angle between each stator coil and the rotor.

In that current rate of change (dI/dT) is directly proportional to coil inductance (L), commutation position may therefore be assessed in an indirect fashion by analyzing the current rate of change (dI/dT) waveforms for each stator coil. In most applications, the "I*R" term and "dΦ/dα" term are substantially negligible and/or sufficiently constant such that they may be ignored without significantly affecting the determination of commutation position. However, for high precision applications or applications in which these terms experience wide fluctuation, normalization steps may be undertaken to remove these extraneous factors such that the current rate of change (dI/dT) provides a highly accurate representation of inductance (L) and hence commutation position.

I. INCREMENTAL COMMUTATION POSITION DETECTION

Referring initially to FIG. 1, shown is a flow chart illustrating the fundamental steps in the incremental commutation position detection method of the present invention during normal operation. The first step 10 requires applying a driving signal (continuous or pulse width modulated) to an active stator coil. Active stator coils are those which, due to their relative position to the rotor, exert a maximum rotational and/or linear torque on the rotor upon being energized with a driving signal. The next step 20 entails monitoring the current waveform of the active stator coil to assess the amount of electric current flowing within the active stator coil as the rotor approaches the active stator coil. In a preferred embodiment, the current waveform is then normalized in step 30 to remove various extraneous factors that may significantly influence the amount of current flowing within the active stator coil, such as fluctuations in motor speed and bus voltage. By removing these influencing factors, the DC component of the current waveform is removed to provide a current waveform comprising only the AC component of the current. It is the AC component of the current that contains the desired commutation position information that is the focus of the present invention.

The normalized current waveform is thereafter differentiated in step 40 to produce a current rate of change waveform representative of the amount of inductance (L) within the active stator coil. In the next step 50, the current rate of change waveform is compared to a predetermined voltage threshold to determine commutation position. In a preferred embodiment, the commutation position signal is subjected to a sample and hold circuit in step 60 for blocking or holding transient-laden portions of the commutation position signal such that a commutation module may apply the driving signal to the next active stator in step 70 without having to resort to filtering to remove such transients. As will be set forth below, the sample and hold step 60 may be employed to overcome the switching transients which occur at each change of state within the PWM pulse train, as well as when the driving signal is redirected to another stator coil. Other than during these holding periods, the commutation module will analyze the commutation position signal to detect a commutation point indicative of the need to direct the driving signal to the next successive stator coil to maintain the rotor in optimal rotational and/or linear motion.

Through the incremental commutation detection method set forth in FIG. 1, the present invention is inventively capable of continuously and accurately determining the position of the rotor relative to the active stator coils within any variety of brushless motor. By providing this real-time commutation position information in the manner described above, the present invention lends itself to many different applications. By way of example and not limitation, two such applications will be described hereinbelow. The first application, as shown in FIG. 2, comprises a system for controlling the sequential commutation of the stator coils within a variable reluctance motor 2 during normal operation and start-up. The second application, as shown in FIG. 7, comprises a system for detecting a stalled condition within a stepper motor. While FIGS. 2 and 7 employ brushless motors of the variable reluctance and stepper types, respectively, it is to be fully recognized that these are set forth by way of example only and, consequently, any number of brushless motors may be substituted therefor without departing from the scope of the present invention.

Referring to FIG. 2, the variable reluctance motor 2 has four stator coils 4, 8, 12, 16 positioned in equidistant relationship about an internally disposed rotor 24. A commutator 28 is provided for selectively directing a driving signal to energize the appropriate stator coils within the motor 2. A plurality of current sensors 42, 44, 46, 48 are provided between commutator 28 and motor 2 to monitor the amount of electric current flowing within stator coils 4, 8, 12, 16, respectively. The current waveforms detected by current sensors 42, 44, 46, 48 are supplied to a switching circuit 34. The switching circuit 34 is further coupled to the commutator 28 and a plurality of normalizing circuits 52, 54, 56, 58 which, in turn, are coupled to a plurality of differentiation circuits 62, 64, 66, 68, respectively. A plurality of comparators 72, 74, 76, 78 are further provided, each having a first input coupled to the respective differentiation circuits 62, 64, 66, 68, a second input coupled to a variable voltage reference 36, and an output coupled to a sample and hold module 38. The sample and hold module 38 is further connected to the commutator 28.

Current sensors 42, 44, 46, 48 may be one of several well known current sensing devices, including but not limited to a current sensing resistor, a current transformer, a Hall-Effect device, or the "on" resistance of a field effect transistor. The switching circuit 34 may comprise any number of commercially available switching components, such as the DG211 analog switch manufactured by Siliconix. As will explained in greater detail below, the switching circuit 34 is capable of selectively directing any number of the current waveforms to their respective normalizing circuit 52, 54, 56, 58 depending upon the input from the commutator 28. The normalizing circuits 52–58 are provided to remove or cancel out various extraneous factors that significantly affect the amount of current flowing within the stator, such as variations in motor load and bus voltage. In a typical embodiment, each normalizing circuit 52–58 may comprise an amplifier having an automated gain control (AGC) configured in a negative feedback arrangement to remove the DC component of the current flowing within the stator coils during commutation. In so doing, a normalized current waveform is thus produced which consists solely of the AC component of the current flowing within the stator coils without the wide fluctuations that may otherwise exist due to variations in bus voltage or motor load. As will be appreciated, extracting the commutation position information within the AC component of the current in this fashion facilitates setting the predetermined voltage threshold at a level sufficient to provide an accurate assessment of commutation position such that the motor can be commutated with great efficiency.

The differentiation circuits 62–68 differentiate each respective normalized current waveform to provide a current rate of change waveform. The differentiation circuits 62–68 may comprise any number of commercially available differentiating components, such as the TL082 operational amplifier manufactured by, among others, Texas Instruments. The comparators 72–78 are provided to compare each respective current rate of change waveform against a predetermined voltage threshold set by the variable voltage reference 36. The output of each comparator 72–78 is monitored by the sample and hold module 38 before passing to the commutator 28. The sample and hold module 38 may comprise any number of. commercially available sample and hold circuits or latching circuits, including but not limited to a 74LS373 IC produced by, among others, Texas Instruments.

In an important aspect of the present invention, the sample and hold module 38 is provided to overcome the adverse affects of switching transients and related noise on the incoming signals from the comparators 72–78 without the need for filtering and related signal processing techniques which may degrade the commutation position information within these signals. The sample and hold module 38 accomplishes this by selectively blocking the comparator output signals during a holding period (when these signals are tainted with switching transients related noise) and selectively sampling these comparator output signals during a sample period (when these signals do not contain such transients). The most prominent cause of transients include when each pulse of a PWM driving signal changes state, as well as when the driving signal is switched or commutated from one stator coil to the next. Thus, in a preferred embodiment, the sample and hold module 38 is directed by the commutator 28 to block out transients for a predetermined period after each PWM pulse change and after each commutation cycle such that only the most pure and noise-free signals are forwarded to the commutator 28. With the assistance of the sample and hold module 38, the commutator 28 may then detect a commutation point indicative of the need to apply the PWM driving signal to the next active stator coil. In this fashion, the PWM driving signal may be applied to the stator coils 4–16 in the appropriate sequence and timing such that a rotating magnetic field is generated within the motor 2 which exerts an optimal amount of rotational and/or linear torque on the rotor 24.

FIGS. 3A–3E illustrate the characteristic waveforms for the incremental commutation position detection method of the present invention as implemented within the system shown in FIG. 2 during normal operation. Stator coil 4 is the active stator coil in the arrangement shown in FIG. 2 in that the rotational position of rotor 24 within motor 2 is such that the energization of stator coil 4 will generate a magnetic field therewithin that will exert the maximum rotational torque upon rotor 24. In the preferred embodiment shown, the commutator 28 will direct the PWM driving signal shown in FIG. 3A to stator coil 4 until it is determined by the incremental commutation position detection method of the present invention that commutator 28 should sequence and thereby direct the PWM driving signal to the next stator coil 8. The PWM driving signal comprises a voltage pulse train of sequential ON and OFF pulses which, for clarity, are designated ON1-ON5 and OFF1-OFF5. Although illustrated as a PWM driving signal, it is to be fully understood that for certain applications the driving signal may also comprise a continuous or fixed excitation signal without departing from the scope of the present invention.

Figure 3B:
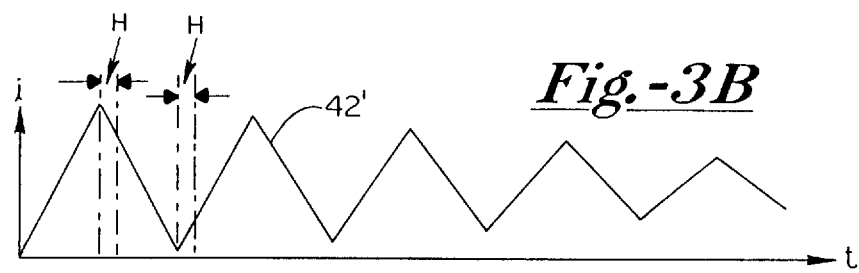
FIG. 3B is the current waveform within the active stator coil of FIG. 2 during commutation.
Figure 3C:
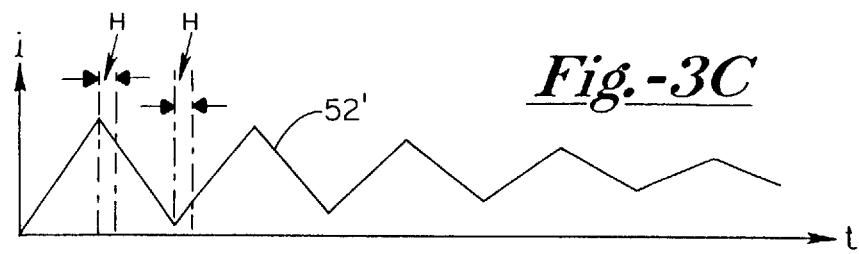
FIG. 3C is the normalized current waveform of the active stator coil of FIG. 2 during commutation.

FIG. 3B illustrates the current waveform 42' within the active stator coil 4 as measured by current sensor 42 throughout the entire application of the PWM driving signal. Close examination will indicate that the slope of the current waveform 42' experiences a progressive decrease through time with each successive ON and OFF pulse of the PWM driving signal. With reference to the aforementioned formula, this decrease in slope stems from the fact that the inductance (L) within the active stator coil 4 increases significantly, and in direct proportion, as rotor 24 approaches the active stator coil 4 which, in turn, causes the dI/dT ratio to progressively decrease as the rotor 24 approaches active stator coil 4. Moreover, although the current waveform 42' is illustrated as an ideal waveform for purposes of clarity, in actuality the current waveform 42' would include significant transients at each change of state within the PWM pulse train. In order to combat this, the sample and hold module 38 holds the signal from reaching the commutator 28 for a predetermined period (H) following each PWM pulse change which, by way of example, is illustrated as the period between each pair of vertical dashed lines for the pulse changes at OFF1 and ON2. Although not shown, it is to be fully understood that the sample and hold module 38 will exert a similar hold period (H) at each change of state within the PWM pulse train. When employed to thwart transients which result from redirecting the driving signal to another stator coil, the sample and hold module 38 may exert a substantially longer holding period (H) which, for example, may span several consecutive PWM pulses such that a sufficient amount of time passes for the transients to settle out of the signals before passing to the commutator 28.

During normal operation, the switching circuit 34 cooperates with commutator 28 to direct only the current waveform for the active stator coil(s) to the appropriate normalizing circuits 52–58. In this case, with stator coil 4 as the only active stator coil, switching circuit 34 passes current waveform 42' to normalizing circuit 54. The normalizing circuit 52 then removes various factors that significantly influence the degree to which current flows within the active stator coil 4 during commutation, such as fluctuations in bus voltage and motor speed. This effect can be seen generally with reference to FIG. 3C, wherein the amplitude of the normalized current waveform 52' is generally smaller than the amplitude of current waveform 42' due to the removal of such influencing factors. Normalized current waveform 52' is then differentiated via the differentiation circuit 62 to produce the current rate of change waveform 62' shown in FIG. 3D. It should be noted with particularity that the voltage level of waveform 62' decreases progressively for each successive PWM ON pulse and increases progressively for each successive PWM OFF pulse. This, once again, is due to the fact that the rate of change of the current (dI/dT) within the active stator coil 4 decreases as the rotor 24 approaches the active stator coil 4.

Figure 3D:
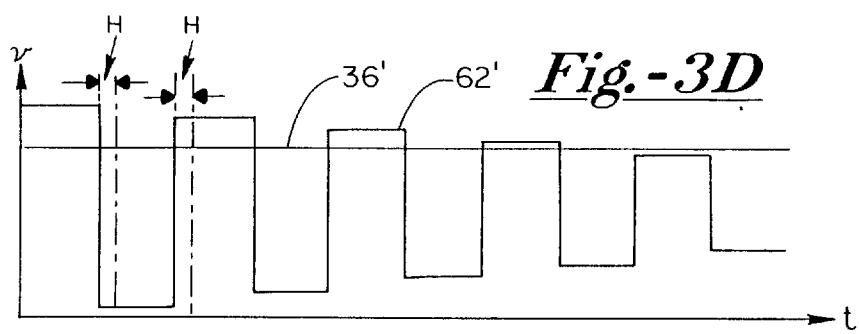
FIG. 3D represents the comparison of the current rate of change waveform of the active stator coil of FIG. 2 with a predetermined voltage threshold.

FIG. 3D illustrates the current rate of change waveform 62' with a predetermined voltage threshold 36' as established by the variable voltage reference 36. In the embodiment shown, the variable voltage reference 36 is configured such that the predetermined voltage threshold 36' detects commutation position based on the amount of current flowing within stator coil 4 during the PWM ON pulses. To do so, the predetermined voltage threshold 36' is set at a level slightly above the current rate of change waveform 62' corresponding to the ON5 pulse of the PWM driving signal to indicate that the rotor 24 is in a position relative to the active stator coil 4 such that the PWM driving should be incremented to the next active stator coil, i.e. stator coil 8. Voltage reference 36 may comprise any number of commercially available variable voltage references, including but not limited to an amplifier configured with a manually adjustable potentiometer for manual adjustment, and an amplifier having an automatic gain control (AGC), such as the AD7524 digital-to-analog converter manufactured by Analog Devices, Inc., for dynamic adjustment. Such dynamic voltage adjustment may be accomplished, for example, by continually tracking the lowest ON pulse voltage plateau for the current rate of change waveform during each commutation cycle.

Figure 3E:
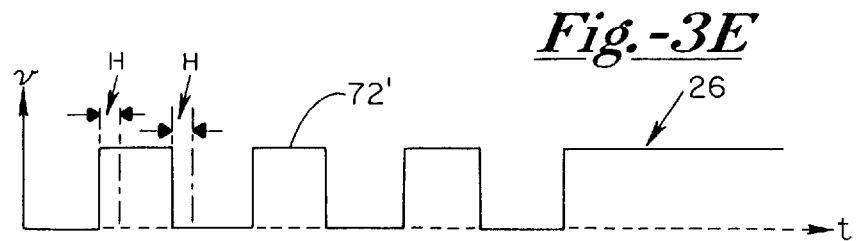
FIG. 3E is the comparator output signal of the comparison shown in FIG. 3D.

FIG. 3E illustrates the output signal 72' of the comparator 72 during the commutation of stator coil 4. In a preferred embodiment, comparator 72 is configured to enter a high or conducting state only when current rate of change waveform 62' drops below predetermined voltage threshold 36'. Comparator output signal 72' therefore produces a pulse train as long as current rate of change waveform 62' keeps intersecting predetermined voltage threshold 36'. Thereafter, with reference to pulse ON5, comparator output signal 72' remains high. The point in time when comparator output signal 72' remains high is referred to as the commutation point, shown as reference numeral 26 in FIG. 3E. In a preferred embodiment, the predetermined voltage threshold 36' should optimally be set such that commutation point 26 occurs when rotor 24 is in direct positional alignment with the active stator coil 4 such that the PWM driving signal may be incremented to the next active stator coil 8 in time to exert the maximum amount of rotational torque upon the rotor 24.

With stator coil 4 as the only active stator coil, the commutator 28 will monitor the output of comparator 72 within the sample period of the sample and hold module 38 to detect the occurrence of the commutation point 26. This can be accomplished in one of several well known techniques. For example, digital logic may be employed to compare the PWM driving signal with the comparator output waveform 72' to detect the point at which the two waveform are simultaneously in the high state. With reference to FIGS. 3A, 3D and 3E, this occurs at the onslaught of pulse ON5, wherein current rate of change waveform 62' fails to intersect the predetermined voltage threshold 36', thereby causing output waveform 72' to remain in the high state at commutation point 26. When commutation point 26 is detected, commutator 28 then directs the PWM driving signal to the next active stator coil in motor 2. In the embodiment shown in FIG. 2, commutator 28 would thus be sequenced to apply the PWM driving signal to stator coil 8 to re-initiate the incremental commutation position detection process with stator coil 8 as the active stator coil.

In the foregoing arrangement, the present invention continuously determines commutation position such that the stator coils 4–16 may be sequentially energized to maintain rotor 24 in continuous and optimal rotation. By way of summary, this is accomplished by:(1) applying a PWM driving signal to the active stator coil(s); (2) monitoring the current waveform of the active stator coil(s); (3) normalizing the current waveform of the active stator coil(s); (4) differentiating the normalized current waveforms to identify the rate of change of the current (dI/dT) within the active stator coil(s); and (5) comparing the rate of change of the current (dI/dT) within the active stator coil(s) to a predetermined voltage threshold 64 to determine when the PWM driving signal should be incremented from the current active stator coil(s) to the next active stator coil(s). This incremental commutation position detection method may include the further step of selectively sampling and holding the commutation position signal such that only the portions thereof which are not tainted with switching transients and related noise are allowed to pass to the commutator 28 for commutating between the various stator coils. The incremental commutation position method is not dependent upon the absolute value of the current flowing within the active stator coils such that it may be utilized in virtually every type of brushless motor, regardless of the particular current flow characteristics, from computer disk drive to massive industrial brushless motors.

Figure 4A:
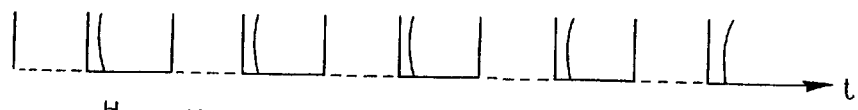
FIGS. 4A–4E represent the commutation position detection waveforms of the embodiment shown in FIG. 2, wherein commutation position is detected by analyzing the current rate of change waveform during each PWM OFF pulse rather than during each PWM ON pulse as in FIGS. 3A–3E.
Figure 4B:
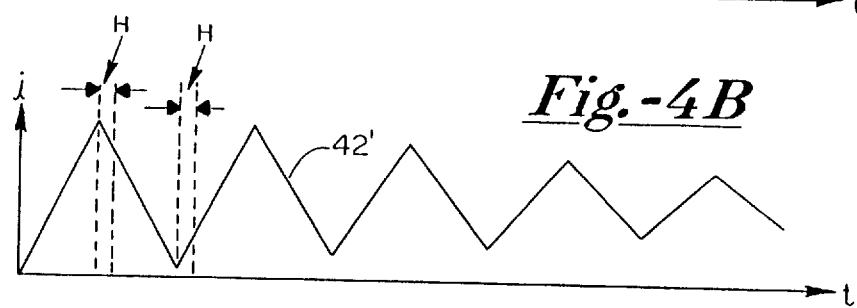
Figure 4C:
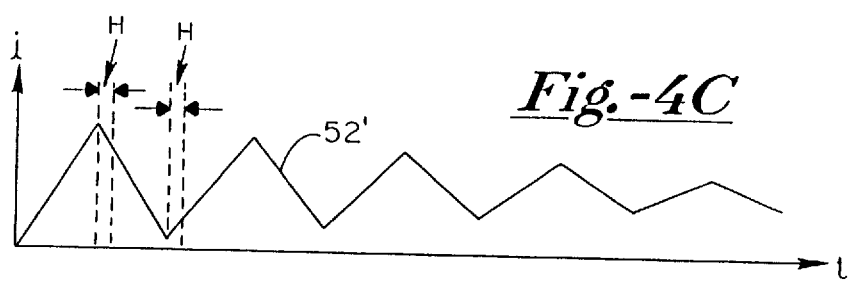
Figure 4D:
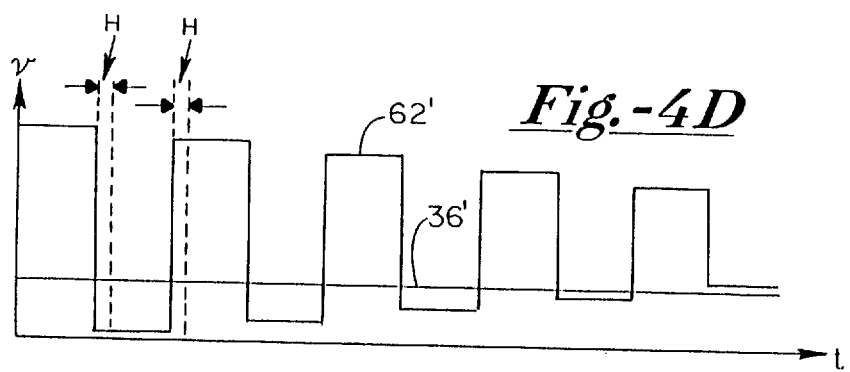
Figure 4E:
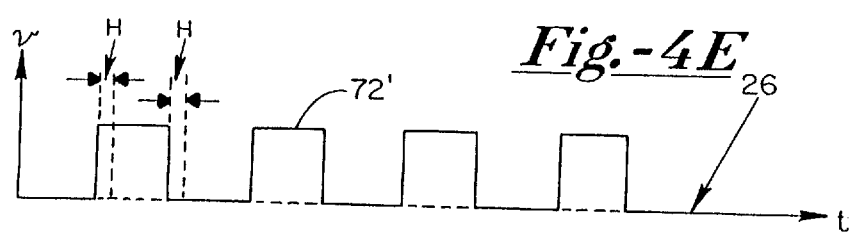

With reference to FIGS. 4A–4E, it is to be fully understood that the foregoing incremental commutation detection method may be performed during the successive PWM OFF pulses without departing from the scope of the present invention. In this instance, commutation position is determined by analyzing the rate of change of the current flowing within the active stator coil 4 (dI/dT) during the successive OFF pulses of the PWM driving signal. As shown in FIGS. 4D and 4E, this can be accomplished by setting the predetermined voltage threshold 36' to trigger the comparator 72 based on the OFF pulse voltage plateaus of current rate of change waveform 62'. In a preferred embodiment, predetermined voltage threshold 36' should be set slightly below the current rate of change waveform 62' at a point corresponding to pulse OFF5, as it is during this time when rotor 24 is closest to direct positional alignment with the active stator coil 4. The comparator 72 will therefore generate a voltage pulse train until waveform 72' fails to intersect the predetermined voltage threshold 36'. The failure of the current rate of change waveform 62' to intersect predetermined voltage threshold 36' will cause the output waveform 72' of the comparator 72 to remain in a low state at commutation point 26. As mentioned above, commutator 28 is configured to detect the occurrence of the commutation point 26 within the sample period of the sample and hold module 38 to apply the PWM driving signal to the next active stator coil, i.e. stator coil 8.

FIG. 5 is a flow chart depicting the fundamental steps of the starting algorithm used to bring a polyphase brushless motor up to the normal operating sequence described above with reference to FIG. 1. The first step 100 involves applying a PWM driving signal to each of the stator coils such that the rotor is disposed in a fixed and stationary position within the motor. The next step 110 entails monitoring the current waveform within each of the stator coils to measure the amount of electric current flowing therewithin. Each current waveform may then be normalized in step 120 to isolate the position information found within the AC ripple current of the current waveforms. The following step 130 involves differentiating each normalized current waveform to produce a current rate of change waveform for each stator coil. These current rate of change waveforms are thereafter simultaneously compared to a predetermined voltage threshold in step 140 to determine whether, for each stator coil, the inductance is higher or lower than the predetermined voltage threshold. With this information, it is possible to identify which stator coil should receive the PWM driving signal as the first active stator coil. The next step 150 involves selectively sampling and holding the commutation position signal such that only those portions which are not distorted with switching transients may reach a commutation module. The final step 160 involves applying the PWM driving signal to the active stator coil such that the rotor is forced into proper rotational motion within the motor.

At start-up the commutation position is unknown to the system shown in FIG. 2. To combat this, the commutator 28 simultaneously directs PWM driving signals to each of the stator coils 4–16 which, consequently, maintains the rotor 24 in a stationary position within the motor 2. During this period, the commutator 28 also directs the switching circuit 34 to pass the current waveforms for each stator coil 4, 8, 12, 16 to the normalizing circuits 52, 54, 56, 58, respectively, for normalization. The normalized current waveforms are then differentiated by the respective differentiation circuits 62, 64, 66, 68 to produce waveforms indicative of the rate of change of the current (dI/dT) within the stator coils 4, 8, 12, 16, respectively. Each differentiated waveform is thereafter compared against the predetermined voltage reference established by the variable voltage reference 36. The commutator 28 decodes the information from the comparators 72–78 within the sample period of the sample and hold module 38 to identify commutation position and thereafter determines which stator coil(s), if energized, will generate a magnetic field sufficient to force the rotor 24 into the proper rotational motion within the motor 2. Following this, the commutator 28 applies the PWM driving signal to the active stator coil(s) to bring the rotor 24 into normal operation.

Figure 6:
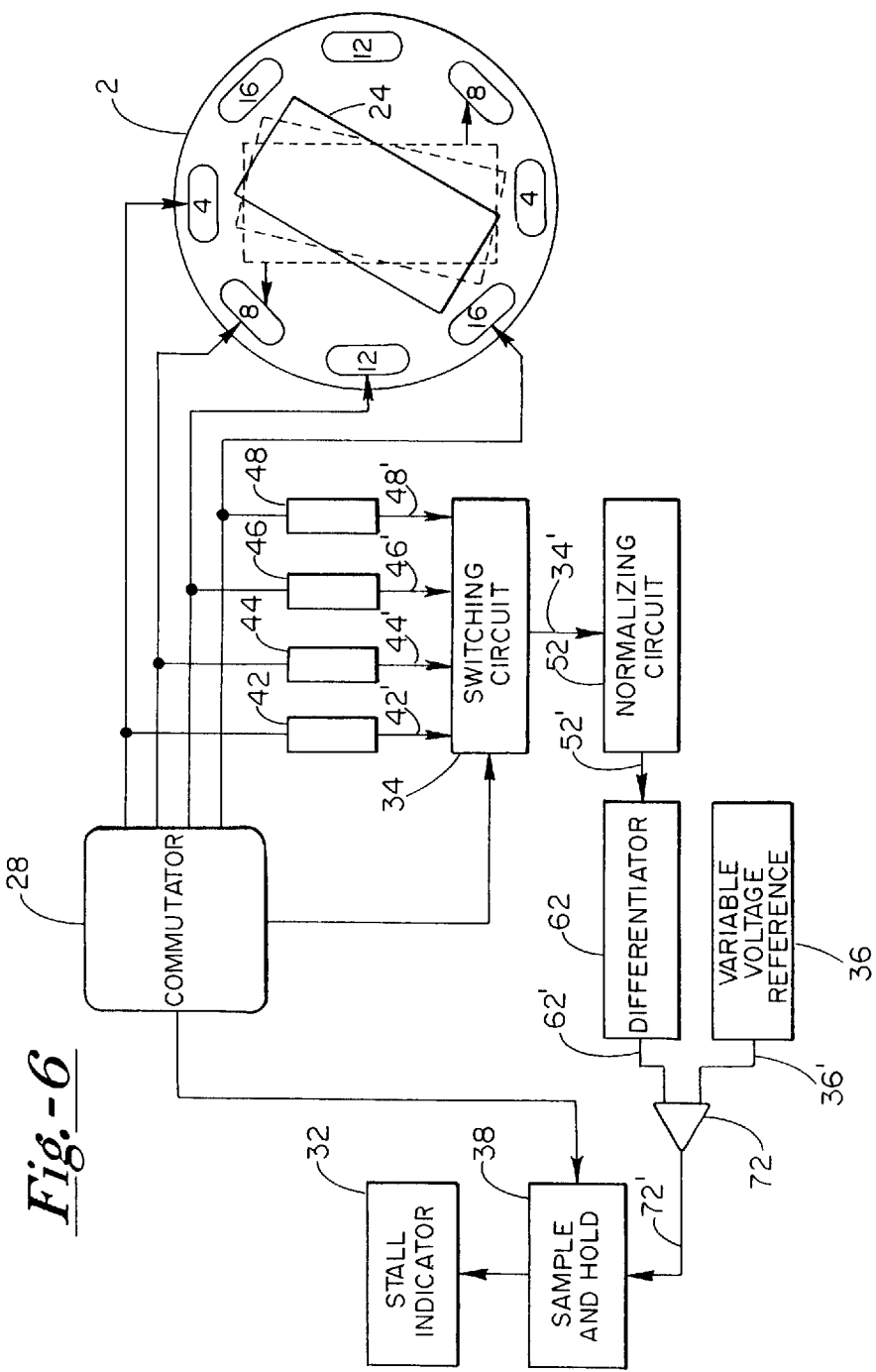
FIG. 6 is a block diagram depicting yet another application of the incremental commutation position detection method set forth in FIG. 1, namely, a system for detecting a stalled condition within a stepper motor.

FIG. 6 illustrates a block diagram of yet another exemplary application of the incremental commutation position detection method of the present invention, namely, a stall detector for brushless motors. In this embodiment, the motor 2 is a stepper motor having a plurality of stator coils 4, 8, 12, 16 disposed in equidistant relationship about an internally disposed rotor 24. A stall indicator 32 is provided to receive the output signal 72' of the comparator 72 during the sample period of a sample and hold module 38. With these exceptions, all functional blocks of this embodiment are similar to those shown in FIG. 2 and, accordingly, a description thereof will not be repeated. It is significant to note, however, the operation of the present embodiment with reference to FIGS. 7A–7E, wherein the predetermined holding periods (H) from the sample and hold module 38 are omitted for clarity.

FIG. 7A represents the PWM driving signal as applied to the active stator coil 4 during a single commutation cycle. Although the driving signal will always be a PWM signal when stepper motors are employed, it should once again be reiterated that certain applications may allow the driving signal by the commutator 28 to be continuous or fixed rather than a pulsed PWM signal. It should also be understood that, if the driving signal is continuous as opposed to a PWM signal, then the sample and hold module 38 may be used solely to block out transients at the beginning of each commutation cycle in that there would be no transients associated with using PWM driving signals. FIG. 7B illustrates the current waveform 48' flowing within the active stator coil 4 during commutation. As readily apparent, the slope (dI/dT) of the current waveform 42' remains constant following pulse OFF2, as shown in dashed lines. Under normal operating conditions, this dI/dT ratio would ordinarily decrease through time as rotor 24 approaches the active stator coil 4. In this case, however, the constant slope (dI/dT) of the current waveform 42' indicates a stalled condition following pulse OFF2 which, in turn, translates into a stalled condition appearing on the normalized current waveform 52' shown in dashed lines in FIG. 7C. When the normalized current waveform 52' is differentiated it produces a constant amplitude on the current rate of change waveform 62' following pulse OFF2, as shown in horizontal dashed lines in FIG. 7D.

The predetermined voltage threshold 36' is set in the same fashion as the embodiment shown in FIG. 2 so as to trigger the comparator 72 based on the ON pulse voltage plateaus of the current rate of change waveform 62'. However, as viewed in FIG. 7E, the output signal 72' of comparator 72 does not stop intersecting the predetermined voltage threshold 36' due to the stalled condition of rotor 24 within the commutation cycle of active stator coil 4. Stall indicator 32 is capable of detecting the failure of current rate of change waveform 62' to stop intersecting predetermined voltage threshold 36' and alerting a user of the stalled condition upon such a detection. Stall indicator 32 may comprise any number of well known circuits to perform these functions. For example, a light emitting diode (LED) may be employed in conjunction with common digital logic to illuminate the LED when it is determined that the current rate of change waveform 62' persists in intersecting the predetermined voltage threshold 36' throughout a portion or the entire commutation cycle of active stator coil 4. As with previous embodiments, the sample and hold module 38 combats switching transients by holding the signal from reaching the commutator 28 for a predetermined period (H) following each PWM pulse change and commutation change.

II. ABSOLUTE COMMUTATION POSITION DETECTION

Referring to FIG. 8, shown is a flow chart illustrating the fundamental steps in the absolute commutation position detection method of the present invention. This method is particularly suited for use with polyphase brushless motors having reluctance paths, such as stepper motors, variable switched reluctance (VSR) motors, and PM brushless motors. The torque output of reluctance motors is proportional to the square of the exciting current such that a small amount of current may be injected into each of the stator coils without appreciably impacting the performance and efficiency of the motor. As will be explained below, the absolute commutation position detection method of the present invention capitalizes upon the aforementioned characteristics of reluctance motors so as to accurately determine commutation both at start-up and during normal operation.

The first step 105 involves injecting at least a nominal amount of current into all of the stator coils. During normal operation, this will entail injecting the non-active stator coils with a nominal amount of current while applying driving signal(s) (fixed or pulses) to the active stator coil(s). At start-up, this will require applying the driving signals to all of the stator coils such that the rotor is maintained in a fixed and stationary position within the motor. The current waveform for each of the stator coils is monitored in step 115 to detect the amount of electric current flowing within each of the stator coils. Thereafter, each current waveform is differentiated in step 125 to produce a current rate of change waveform. As noted above, the current rate of change (dI/dT) is a function of the inductance (L) of each stator coil which, in turn, is a function of commutation position. Commutation position may therefore be detected by effectively analyzing the current rate of change. (dI/dT) waveforms for each stator coil. In an important aspect of the present invention, this analysis resides in step 135, wherein the current rate of change (dI/dT) waveforms of at least two of the stator coils are compared so as to determine the absolute position of the rotor within the motor. After determining commutation position in this fashion, a sample and hold circuit is employed in step 145 for selectively sampling and holding the commutation position signal such that only the portions thereof which are free from switching transients and related noise may reach a commutation module in step 155 to determine which stator coil(s) should be commutated with a driving signal and carry out the same.

In an important aspect of the present invention, the aforementioned process eliminates the need to perform additional normalization steps in that errors common to all of the stator coils cancel out during step 135. That is to say, extraneous factors which significantly affect the rate of change of the current (dI/dT), including fluctuations in temperature, motor speed, bus voltage, and air gap, are effectively canceled out. Moreover, by selectively choosing the appropriate comparison points, variations due to the change in flux and rotor angle (dΦ/dα) may be effectively canceled out, once again eliminating the need for a separate and distinct stage of normalization. This aspect is particularly advantageous when employing switched reluctance motors in that these motors may develop significant dΦ/dα values which may adversely impact the current rate of change waveform (dI/dT) pursuant to the aforementioned formula. Of course, in the instance where the comparison points may not be properly selected to cancel out the dΦ/dα values, further normalization steps may be engaged.

The present invention is also advantageous in that it provides an absolute reference for determining commutation position, rather than an incremental reference as provided by the incremental commutation position detection method detailed above. This absolute reference, once again, is accomplished by comparing together the current rate of change waveforms (dI/dT) of at least two of the stator coils so as extract only the most accurate positional information from the current waveforms. The incremental method, on the other hand, assesses the current rate of change waveform (dI/dT) of the active stator coil against a predetermined voltage threshold to identify a commutation point indicative of the need to redirect or increment the PWM driving signal to the next active stator coil. Noise interference, if introduced during this comparison with the predetermined voltage threshold, may adversely affect the efficiency of the incremental commutation position detection arrangement set forth above. In contrast, the absolute commutation position detection method obtains the vital positional information without regard the status of each stator coil, i.e. active or inactive, and thus is less subject to noise interference.

FIGS. 9 and 10 represent two exemplary applications of the absolute commutation position detection method set forth above. In both embodiments, the motor 2 is a variable switched reluctance motor having a plurality of stator coils 4, 8, 12, 16 disposed in equi-distant relationship about an internally disposed rotor 24. As with the embodiments shown in FIGS. 2 and 6, a plurality of current sensors 42, 44, 46, 48 are provided between a commutator 28 and the motor 2 so as to monitor the amount of electric current flowing within stator coils 4, 8, 12, 16, respectively. The current sensors 42, 44, 46, 48 are further coupled to a plurality of differentiation circuits 62, 64, 66, 68, respectively, for determining the rate of change of the current (dI/dT) flowing within each respective stator coil 4, 8, 12, 16. The main distinction between the embodiments shown in FIGS. 9 and 10 resides in the manner in which the differentiated current waveforms (dI/dT) are processed prior to being communicated to the sample and hold module 38 and commutator 28.

FIG. 9 employs a parallel processing arrangement having a plurality of comparators 69, 71, 73, 75, 77, 79 which collectively compare each possible combination of the various current rate of change waveforms (dI/dT). As will be appreciated by those skilled in the art, these comparisons provide an indication of the relative inductance (L) levels within each of the stator coils.4–16 which, as noted above, translates into an indication of the relative distance between each stator coil and the rotor. Upon receiving this information during the sample period of the sample and hold module 38, the commutator 28 may then calculate which of the various stator coils 4–16 should be energized to either start the rotor 24 in proper rotation at start-up or exert maximal torque on the rotor 24 during normal operation. Although shown using six separate comparators 69–79 in this embodiment, it is to be fully understood that commutation position may be detected in certain applications using based solely on the output a single comparator. This is due to the fact that it only takes one comparison to eliminate out the errors common to all stator coils and, moreover, because the amount of positional information from each comparison varies depending upon commutation position. As such, it is possible to ignore certain comparisons without significantly affecting the operation of the motor 2.

FIG. 10 represents one example of this phenomena, wherein a multiplexed processing arrangement is employed to selectively compare two current rate of change waveforms (dI/dT) for the purpose of determining commutation position. This is accomplished by coupling the output of each differentiation circuit 62–68 to a first multiplexer 82 and a second multiplexer 84. The first and second multiplexers 82, 84 are selectively switched submit only two of the various current rate of change waveforms (dI/dT) to a single comparator 86. The comparator 86 performs the desired comparison and thereafter provides the resulting positional information to the sample and hold module 38 which, as noted above, forwards these signals to the commutator 28 during a selected sampling period. Based upon this information, the commutator 28 directs the PWM driving signals to the appropriate stator coils 4–16 for initial rotation (i.e. start-up) or continued rotation (i.e. normal operation).

This invention has been described herein in considerable detail to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

For example, although FIGS. 1 and 5 illustrate the normalization step as preceding the differentiation step, it is to be readily understood that these-steps may be juxtaposed without departing from the scope of the present invention such that the current waveforms may be differentiated prior to normalization. Moreover, it is to be readily understood that, for certain applications, the normalization step may be wholly omitted from the incremental commutation position detection method described above. This stems from the fact that the normalization step is designed to remove various extraneous factors, such as fluctuations in motor speed and bus voltage, which significantly affect the rate of change of the current (dI/dT) flowing within the active stator coil. By maintaining the bus voltage and motor speed at a constant level, the significant variations in current rate of change that normally result from fluctuations in bus voltage and motor speed are eliminated. As such, the incremental commutation position detection method of the present invention is capable of determining commutation position without performing the aforementioned normalization.

It is furthermore noted that, although the absolute commutation position detection method of the present invention does not require normalization, this additional step may nonetheless be performed, either before or after the differentiation stage, if so desired.

It is also to be understood that motor 2 may have greater or fewer than the number of stator coils shown in the Figures without departing from the scope of the invention. Moreover, any type of brushless motor may be implemented in accordance with the present invention, including but not limited to variable reluctance, permanent magnet, and stepper motors.

What is claimed is:

1. A method of starting a polyphase brushless motor, said brushless motor having a plurality of field coils disposed about a rotor, comprising the steps of:
   (a) simultaneously energizing each of said plurality of field coils with a driving signal while said rotor is maintained in a fixed position within said motor;
   (b) continuously monitoring the current waveform for each of said plurality of field coils during said step of simultaneously energizing;
   (c) continuously differentiating said current waveform for each of said plurality of field coils to define a current rate of change waveform for each of said plurality of field coils;
   .(d) comparing said current rate of change waveform for each of said plurality of field coils to a predetermined voltage threshold to determine commutation position; and
   (e) applying a driving signal to an active field coil based on said commutation position to initiate said rotor into motion within said motor.

2. The method as set forth in claim 1 and further wherein said step (b) comprises the steps of:
   (i) providing current sensing means associated with each of said plurality of field coils; and
   (ii) sensing the current waveform of each of said plurality of field coils during step (a).

3. The method as set forth in claim 2 and further wherein said step (c) comprises the steps of:
   (i) providing differentiation means associated with said current sensing means;
   (ii) differentiating said current waveform of each of said plurality of field coils to define a current rate of change waveform for each of said plurality of field coils.

4. The method as set forth in claim 3 and further, wherein said step (d) comprises the steps of:
   (i) providing means for adjustably setting said predetermined voltage threshold associated with said differentiation means;
   (ii) setting said means for adjustably setting such that said predetermined voltage threshold provides a reference upon which to compare said current rate of change waveform for each of said plurality of field coils; and (iii) comparing said current rate of change waveform for each of said plurality of field coils to determine said active field coil.

5. The method as set forth in claim 3 and further, wherein said step (e) comprises the further steps of:

(i) providing commutation means for generating said driving signal; and (ii) applying said driving signal to said active field coil to initiate said rotor into motion within said motor.

6. The method as set forth in claim 1 and further, wherein step (b) includes the further step of continuously normalizing the current waveform within said stator coil.

7. The method as set forth in claim 6 and further, comprising the further steps of:

(i) providing normalization means associated with said differentiation means; and (ii) employing said normalization means to remove unwanted noise artifacts from one of said current waveform and said current rate of change waveform of said stator coil.

8. The method as set forth in claim 1 and further, wherein step (e) includes the further step of providing sample and hold means for selectively sampling and holding the commutation position signal generated in step (d) to eliminate switching transients.

9. A method of starting a brushless polyphase motor having a rotor and a plurality of field coils, comprising the steps of:

(a) applying a driving signal to each of said plurality of field coils while said rotor is stationary;

(b) continuously differentiating the current waveform within each of said plurality of field coils during step (a);

(c) continuously comparing the differentiated current waveforms from step (b) to a predetermined voltage threshold; and (d) selectively energizing at least one of said plurality of field coils based on the comparisons from step (c) to force said rotor into proper rotational motion.

10. The method set forth in claim 9 and further wherein step (b) comprises the steps of:

(i) providing current sensing means for sensing the current waveform within each of said plurality of field coils;

(ii) providing differentiation means associated with said current sensing means; and (iii) differentating said current waveform within each of said plurality of field coils via said differentiation means.

11. The method set forth in claim 10 and further, wherein step (c) comprises the substeps of:

(i) providing means for adjustably setting said predetermined voltage threshold;

(ii) providing comparing means for comparing each of said differentiated current waveforms to said predetermined voltage threshold; and (iii) comparing said differentiated current waveforms from step (b) to said predetermined threshold to determine the relative position of each of said plurality of field coils to said rotor.

12. The method set forth in claim 11 and further wherein step (d) comprises the steps of:

(i) determining which of said plurality of field coils is in the closest positional alignment with said rotor to define an active field coil; and (ii) applying said driving signal to said active field coil.

13. A method for detecting the position of a rotor with respect to a plurality of field coils in a polyphase brushless motor, comprising the steps of:

(a) continuously injecting at least a predetermined nominal exciting current into each of said plurality of field coils;

(b) continuously monitoring the current waveform for each of said plurality of field coils during said step of continuously injecting;

(c) continuously differentiating said current waveform for each of said plurality of field coils to define a current rate of change waveform for each of said plurality of field coils; and (d) comparing the magnitude of at least two of said current rate of change waveforms to one another to produce an absolute reference indicative of the position of said rotor within said motor.

14. The method as set forth in claim 13 and further wherein said step (b) comprises the steps of:

(i) providing current sensing means associated with each of said plurality of field coils; and (ii) sensing said current waveform of each of said plurality of field coils during step (a).

15. The method as set forth in claim 13 and further wherein said step (c) comprises the steps of:

(i) providing differentiation means associated with each of said current sensing means;

(ii) differentiating said current waveform of each of said plurality of field coils to define a current rate of change waveform for each of said plurality of field coils.

16. The method as set forth in claim 13 and further, wherein said step (d) comprises the further steps of:

(i) providing comparator means associated with at least two of said plurality of differentiation means;

(ii) comparing together the magnitude of said current rate of change waveform of each of said at least two of said plurality of differentiation means.

17. The method as set forth in claim 16 and further, wherein said step (d)(i) comprises the step of providing a plurality of comparators associated with at least two of said plurality of differentiation means.

18. The method as set forth in claim 16 and further, wherein said step (d)(i) comprises the steps of:

(a) providing at least two multiplexers having inputs coupled to each of said plurality of differentiation means and an output coupled to a comparator; and (b) controlling said at least two multiplexers to selectively submit two of said plurality of current rate of rate waveforms to said comparator.

19. A method for determining commutation position within a brushless motor having a plurality of stator coils disposed about a rotor, comprising the steps of:

(a) applying at least a predetermined nominal electric current to each of said plurality of stator coils;

(b) continuously differentiating the electric current flowing within each of said plurality of stator coils during step (a) to produce a current rate of change waveform for each of said plurality of stator coils; and (c) continuously comparing together at least two of said current rate of change waveforms to determine an absolute reference indicative of the position of said rotor within said motor.

20. The method set forth in claim 19 and further wherein step (b) comprises the steps of:
   (i) providing current sensing means for sensing said electric current within each of said plurality of field coils;
   (ii) providing differentiation means associated with said current sensing means; and
   (iii) differentating said electric current within each of said plurality of field coils via said differentiation means.

21. The method set forth in claim 19 and further, wherein step (c) comprises the substeps of:
   (i) providing comparator means associated with said differentiation means;
   (ii) comparing at least two of said current rate of change waveforms.

22. The method as set forth in claim 21 and further, wherein said step (c)(i) comprises the step of providing a plurality of comparators associated with said differentiation means.

23. The method as set forth in claim 21 and further, wherein said step (c)(i) comprises the step of providing a comparator, a first multiplexer for selectively submitting at least one of said plurality of current rate of change waveforms to said comparator, and a second multiplexer for selectively submitting at least one of said plurality of current rate of change waveforms to said comparator, and step (c)(ii) comprises the step of controlling said first and second multiplexers to selectively submit at least two of said plurality of current rate of change waveforms to said comparator.

24. An apparatus for controlling the operation of a polyphase brushless motor having rotor and a plurality of stator coils, comprising:
   (a) commutation position detection means for determining the position of said rotor relative to said plurality of stator coils, said commutation position detection means including:
      (i) current sensing means for sensing the amount of electric current flowing within each of said plurality of stator coils;
      (ii) differentiation means for differentiating said amount of electric current flowing within each of said plurality of stator coils; and
      (iii) comparator means for comparing together said differentiated electric current of at least two of said plurality of stator coils to determine an absolute reference indicative of a position of said rotor within said motor; and
   (b) commutation means for selectively applying at least a predetermined nominal electric current to each of said plurality of stator coils and selectively applying a driving signal to one or more of said plurality of stator coils depending upon said absolute reference.

25. The apparatus as set forth in claim 24 and further, wherein said comparator means comprises at least two comparators coupled between said differentiation means and said commutation means.

26. The apparatus as set forth in claim 24 and further, said comparator means comprising multiplexing means and a comparator, said multiplexing means for selectively passing said differentiated electric current for at least two of said plurality of stator coils to said comparator.

27. The apparatus as set forth in claim 24 and further, said commutation position detection means including sample and hold means disposed between said comparator means and said commutation means, said sample and hold means for selectively sampling and holding the commutation position signal generated by said comparator so as deliberating block out the transient-laden portions of said commutation position signal.

28. An apparatus for determining commutation position within a brushless motor having a rotor and plurality of stator coils, comprising:
   (a) current sensing means for sensing the amount of electric current flowing within each of said plurality of stator coils;
   (b) differentiation means for differentiating said amount of electric current flowing within each of said plurality of stator coils; and
   (c) comparator means for comparing together said differentiated electric current of at least two of said plurality of stator coils to determine an absolute reference indicative of a position of said rotor within said motor.

29. The apparatus as set forth in claim 28 and further, wherein said comparator means comprises at least two comparators coupled between said differentiation means and said commutation means.

30. The apparatus as set forth in claim 28 and further, said comparator means comprising multiplexing means and a comparator, said multiplexing means for selectively passing said differentiated electric current for at least two of said plurality of stator coils to said comparator.

* * * * *